United States Patent Office 3,470,532
Patented Sept. 30, 1969

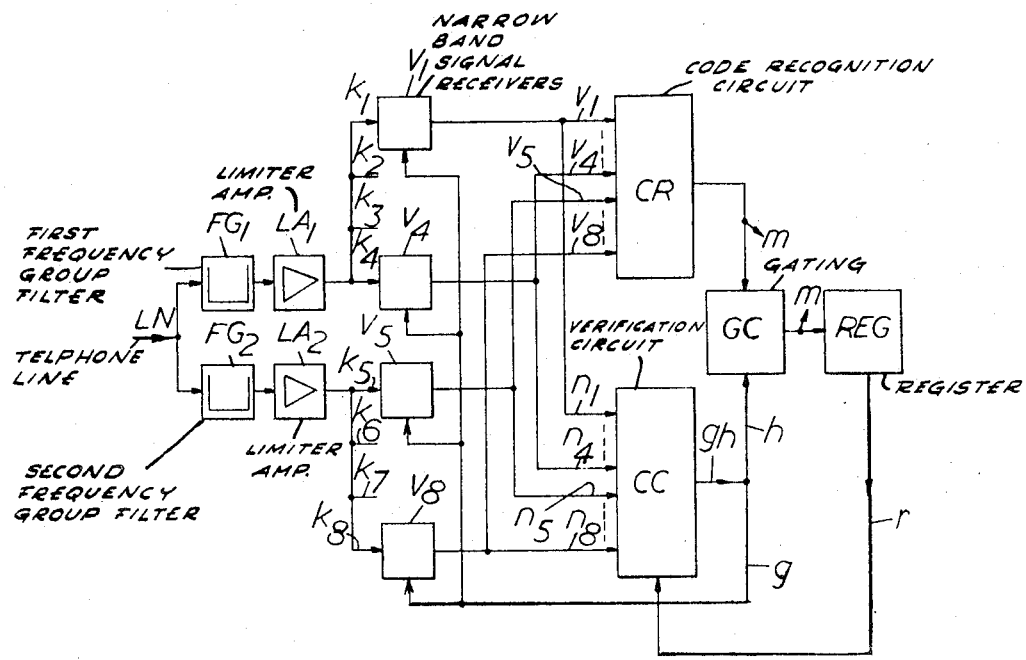

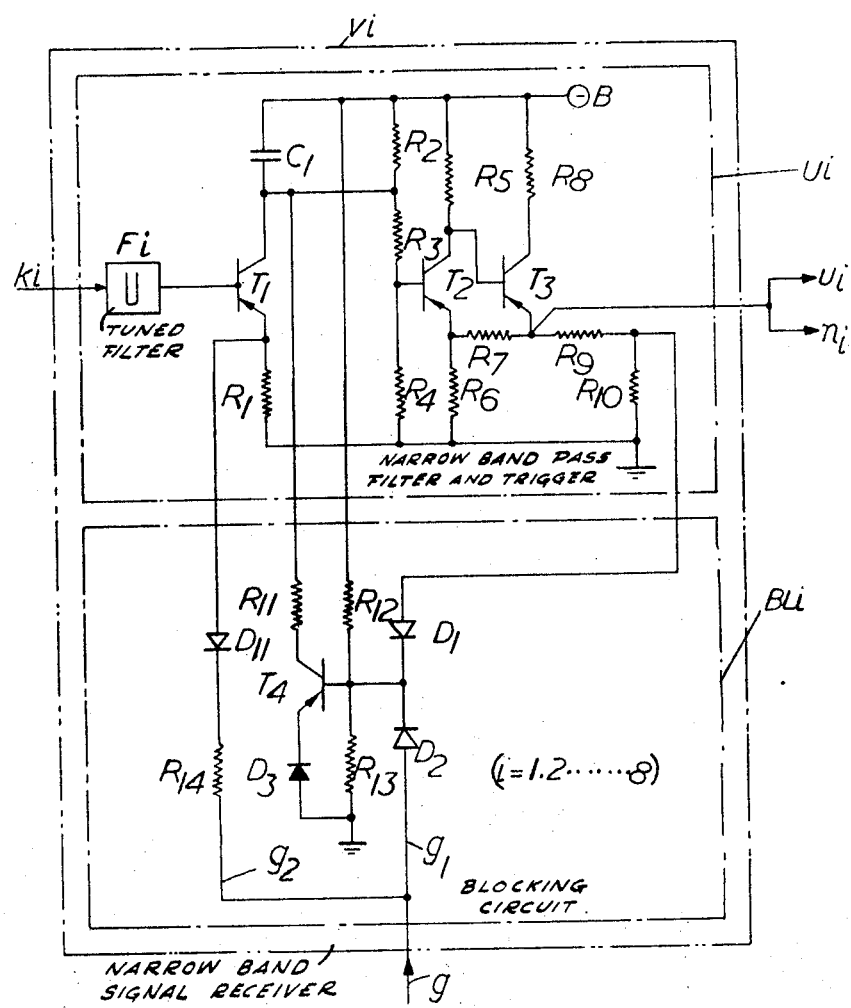

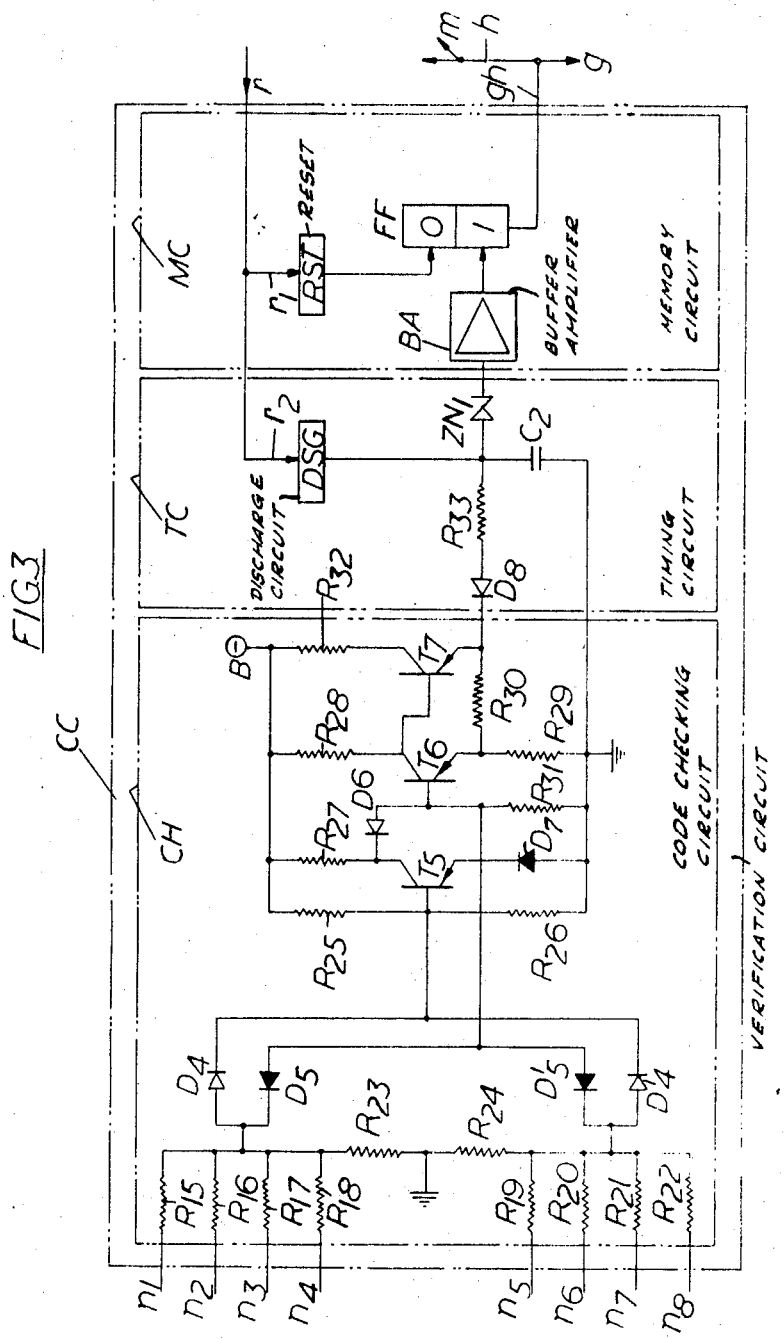

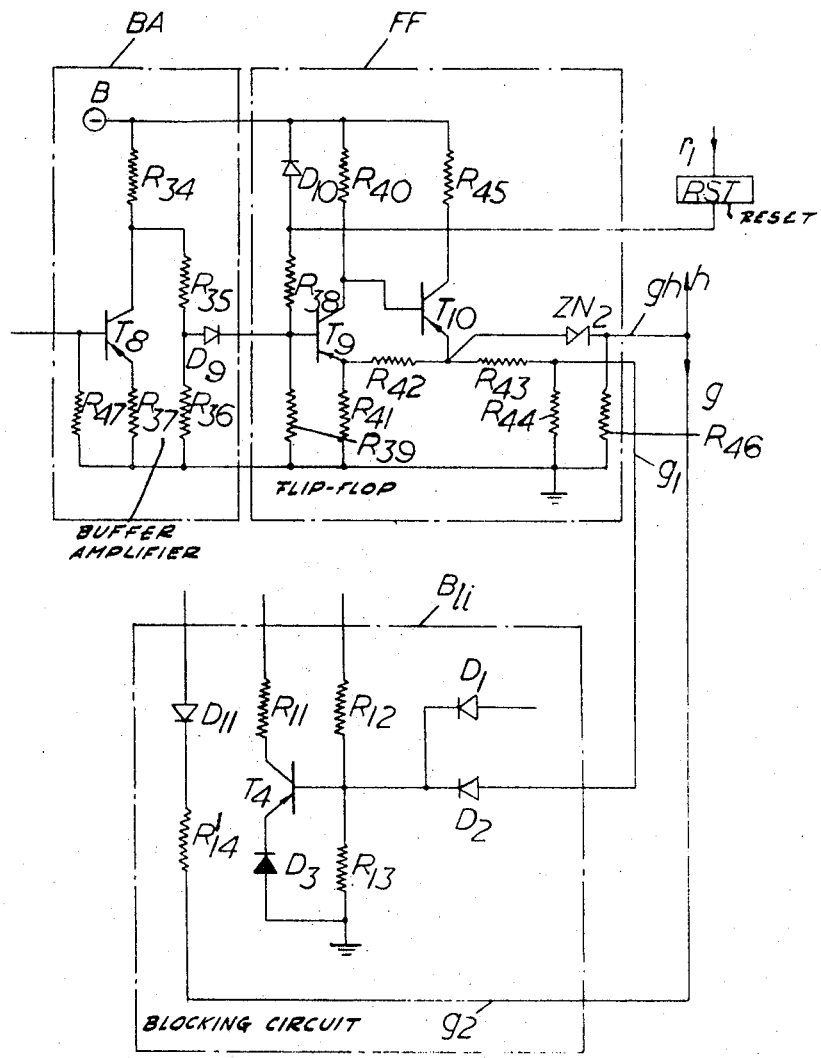

3,470,532
CODE CHECKING CIRCUIT AND MULTI-FREQUENCY DATA RECEIVER
Jean Victor Martens, Deurne-Zuid, and Marcel Clement Rene Natens, Antwerp, Belgium, assignors to International Standard Electric Corporation
Filed June 29, 1965, Ser. No. 468,070
Claims priority, application Netherlands, July 9, 1964, 6407780
Int. Cl. G08b 29/00
U.S. Cl. 340—146.1
10 Claims

ABSTRACT OF THE DISCLOSURE

A low-speed multifrequency data receiver capable of operating over a telephone network incorporates a code checking circuit therein. This data receiver operates responsive to a multifrequency code. A code verification is carried out by means of the checking circuit which comprises code checking circuit having a pair of oppositely poled rectifiers for each group of four frequency receivers and a common to all (two) groups circuit which is constituted by a level detector and a Schmitt trigger. The arrangement is designed so that the Schmitt trigger circuit is triggered only when a correct code is received.

---

The present invention relates to a code checking circuit connected to a number of DC potential sources and adapted to react upon all said sources having their potential in a predetermined potential range, e.g. narrow, each of said sources being connected via first and a second individual rectifier or similar device to electrical means common to all the sources, said electrical means being able to assume two distinct electrical conditions.

Such a code checking circuit is known from the Belgian Patent 583,188 (J. De Buck 3rd). It is an object of the present invention to provide an improved, simpler and more economical code checking circuit of the above type.

The present code checking circuit is characterized by the fact, that a common electrical means include a level detecting device. An input of the device is connected to a number of DC potential sources via first individual rectifiers and a trigger circuit. An input of the trigger circuit is connected to the output of the level detecting device via a decoupling third rectifier and to the DC potential sources via their second individual rectifiers the trigger circuit is set in its second condition when all of the sources have their potential in the predetermined range. The first and said second individual rectifiers are then in the conductive and blocked condition respectively. The trigger circuit is set in its first condition when at least one of the sources has its potential either below or above the predetermined range. The first and the second individual rectifiers of the one source is then either conductive and blocked, or blocked and conductive respectively. The level detecting device is in its first, e.g. rest condition, when at least one of the sources has its potential below the predetermined range.

The invention also relates to a multifrequency data receiver including a number of sets of narrow-band frequency receivers. A predetermined number of the frequency receivers, out of each of said sets, reacts to a received data signal. Code checking means verify the correctness of a received data signal. A timing means delays the response of the code checking means. Bistate means memorizes the delayed response of the code checking means and blocking means for controlling the condition of the frequency receivers when bistate means has memorized the delay response.

Such a multifrequency data receiver is known from the article "A Multifrequency Data Set for Parallel Transmission up to 20 Characters Per Second" by B. R. Saltzberg and R. Sokoler, published in the Bell Telephone System Monograph No. 4,221.

The present multifrequency data receiver is characterized by the fact, that each of the narrow band frequency receivers comprises a narrow frequency-band filter followed by an input amplifier, a smoothing filter and a trigger circuit which has one input and one or more outputs. The outputs assume first or second fixed DC potentials when one input is in the rest or in the activated condition respectively. The blocking means include a number of switching devices, e.g. transistors, equal to the number of the frequency receivers and correspondingly associated thereto. Each of the switching devices has at least three electrodes. The first or input electrode, e.g. the base, is connected, on the one hand, to an output of said trigger circuit of the associated frequency receiver and to a 1-output of said bistate means through a first and a second decoupling diode respectively, and on the other hand, to a third and a fourth fixed DC potentials through a first and a second resistance respectively. The second or output electrode, e.g. the collector, is connected to the input of the trigger circuit through a third resistance. The third electrode e.g. the emitter, is coupled to the third fixed DC potential, e.g. ground, the first and said second diodes, which are normally conductive, are put into the blocked condition when the associated trigger circuit and the bistate means are triggered from their 0 to their 1-condition respectively. Each of the switching devices, which is normally in the blocked condition, is brought into the conductive condition when both the first and second diodes, which are connected to its input electrode, are brought in the blocked condition. The switching device is then maintained in the operated or 1-condition of the associated trigger circuit.

The above mentioned and other objects and features of the invention will become more apparent and the invention itself will be best understood by referring to the following description of embodiments taken in conjunction with the accompanying drawings in which:

FIG. 1 represents a block diagram of a multifrequency data receiver according to the invention;

FIG. 2 shows an narrow band frequency receiver and the part of blocking means associated to this frequency receiver;

FIG. 3 represents a code checking circuit with associated timing and memory means, forming part of the receiver of FIG. 1;

FIG. 4 shows in detail a preferred embodiment of the memory means of FIG. 3 and of the part of the blocking means of FIG. 2.

FIG. 1 shows a multi-frequency data receiver. The telephone line LN feeds in parallel to a first and a second group or set of narrow band frequency receivers via the cascaded arrangement of a first frequency group filter FG1 with a first limiter amplifier LA1, and a second frequency group filter FG2 with a second limiter amplifier LA2 respectively. Each of the first and second groups of narrow band frequency receivers comprises four frequency receivers included in the blocks V1 to V4 and V5 to V8 respectively.

The present multi-frequency data receiver operates according to the well known 2-out-of-8 code system, wherein any one of the possible 16 different code signals or characters is constituted by one frequency out of each of a first and a second group of four frequencies. Although the present data receiver may thus be able to handle sixteen digits, it is supposed to handle 12 characters ($m=12$) comprising ten numeric digits and two control characters.

The narrow band frequency receivers of the first group are each tuned to react to a corresponding frequency of the first group of frequencies, this frequency group comprising the four higher frequencies among the eight ones. In a similar way the receivers of the second receiver group are associated to the second frequency group which comprises the four lower frequencies. Therefore, the group separation filters FG1 and FG2 are a high pass and a low pass filter respectively.

The input $k1$ to $k4$ of the first group of frequency receivers are interconnected and their junction point is connected to the output of the limiter amplifier LA1. In a similar way, the junction point of the inputs $k5$ to $k8$ of the frequency receivers of the second group is connected to the output of the limiter amplifier LA2. The output of each of the eight frequency receivers is connected to a corresponding input $v1$ to $v8$ and $n1$ to $n8$ of a code recognition circuit CR and a verification circuit CC respectively. The $m=12$ outputs of the code recognition circuit CR which are indicated by the multiplying arrow $m$ are connected to $m=12$ corresponding inputs of a gating circuit GC. This gating circuit GC is for instance constituted by twelve two-inputs AND gates, one input of each such AND gate being connected to a corresponding output of the twelve ($m=12$) outputs of the code recognition circuit CR. The second inputs $h$ of these AND gates are each connected to the output $gh$ of the verification circuit CC. The output $gh$ of the verification circuit CC is also connected via the lead $g$ to an input of eight blocking circuits correspondingly associated with the eight frequency receivers of the data receiver and also included in the blocks V1 to V8 as will be explained later. The gating circuit GC has $m$ outputs connected to $m$ corresponding inputs of a register circuit REG which has an output $r$ connected to a reset input of the verification circuit CC.

Referring to FIG. 2 there are shown the detailed circuits of a narrow band frequency receiver U$i$ and of its associated blocking circuit BL$i$, both these circuits being comprised in a block V$i$ ($i=1, 2 \ldots 8$) of FIG. 1. The narrow band frequency receiver U$i$ comprises a narrow frequency band filter or tuned circuit F$i$, an input amplifier constituted by a PNP transistor T1, a smoothing filter comprising a capacitor C1 and a resistor R2 and a Schmitt trigger circuit comprising the PNP transistors T2 and T3. The filter F$i$ has its input $ki$ connected to the output of the limiter amplifier LA1 or LA2 (FIG. 1) and its output connected to the base of the transistor T1 which is normally not conductive. The emitter and the collector of the transistor T1 are connected to ground and to a battery B($B=-20$ v.) through the resistor R1(R1=560 ohm)

and through the parallel connection of the capacitor

C1(C1=2, 2 µf.)

and the resistor R2($R_2$=10,000 ohm), respectively. The base of the transistor T2 is connected on the one hand to the battery B through the series connection of the resistors R3(R3=8,200 ohm) and R2 and on the other hand to ground through the resistor R4(R4=2,200 ohm). The collector of the transistor T2 which is normally conductive is connected to the battery B through the resistor R5(R5=5,600 ohm) and also directly to the base of the transistor T3 which is normally not conductive. The emitter of the transistor T2 is connected on the one hand to ground via the resistor R6(R6=330 ohm) and on the other hand to the emitter of the transistor T3 via the resistor R7(R7=3,300 ohm). The emitter and the collector of the transistor T3 are connected to ground and to the battery B through the series connection of the resistors R9, R10 (R9=2,200 ohm, R10=220 ohm) and through the resistor R8 (R8=56 ohm), respectively. One output of the trigger circuit T2, T3 is constituted by the emitter of the transistor T3 and is connected to a corresponding input $vi$ and $ni$ of the code recognition circuit CR and of the verification circuit CC respectively.

The blocking circuit BL$i$ comprises the normally not conductive PNP switching transistor T4 the emitter of which is connected to ground through the silicon diode D3. The collector of the transistor T4 is connected to the junction point of the resistors R2 and R3 of the associated frequency receiver U$i$ through the resistor R11(R11=5,600 ohm)

The base of the transistor T4 is connected on the one hand, to the battery B through the resistor R12(R12=68,000 ohm)

and to another output of the Schmitt trigger circuit T2, T3 taken from the junction point of the resistors R9, R10 through the diode D1 and, on the other hand, to ground through the resistor R13 (R13=5,600 ohm) and to the output $g$ of the verification circuit CC through the diode D2 and the conductor $g1$. The emitter of the transistor T1 of the frequency receiver U$i$ is also connected to the output $g$ of the verification circuit CC through the series connection of the diode D11, the resistor R14(R14=1000 ohm) and the conductor $g2$.

It should be noted that in the rest condition of the data receiver, the base of the switching transistor T4 of the blocking circuit B$li$ is substantially biased at ground potential. Indeed, the value of the resistor R10 of the frequency receiver U1 and the value of the 1-output resistance of the bistate circuit FF have been chosen sufficiently low (220 ohm), so that the diodes D1 and D2 are conductive and their cathodes are substantially at ground potential. The silicon diode D3 in the emitter of the transistor T4 establishes a threshold of potential of $-0.7$ v., for the transistor T4, so that this transistor T4 may only become conductive for a base potential more negative than $-0.7$ v., thus securing the nontransistor T4 in the rest condition of the data receiver. The values of the potentiometer resistors R12 and R13 have been so chosen that when both of the diodes D1 and D2 are blocked, the base of the transistor T4 is biased at $-1.5$, i.e. the transistor T4 becomes conductive. The diode D1 is blocked when the Schmitt trigger (T2, T3), of the associated frequency receiver, is triggered. Whereas, the diode D2 is blocked when the 1-output of the bistable circuit FF is activated respectively. In each of these cases, the potential of the anode of the respective diode D1 or D2 becomes more negative than $-1.5$ v. The transistor T4 is hence maintained in the blocked condition when either of the two diodes D1 or D2 is conductive.

Referring to FIG. 3, the verification circuit CC comprises the cascade arrangement of the code checking circuit CH, the timing circuit TC and the bistate or memory circuit MC.

The code checking circuit CH includes two groups of input resistors R15 to R18 to R22 (R15 to R22=2,200 ohm), connected at one end ($n1$ to $n4$ and $n5$ to $n8$) to the corresponding outputs of the two groups of the frequency receivers U1 to U4 to U5 to U8 (FIG. 2). The other ends of the resistors R15 to R18 of the first group are interconnected and their junction point is grounded through the resistor R23 (R23=150 ohm). In a same way the junction point of the other ends of the resistors R19 to R22 of the second group is connected to ground through the resistor R24 (R24=150 ohm). The above junction points of the resistors R15 to R18 and R19 to R22 are also connected, on the one hand, to the input of a level detecting device comprising a normally not conductive PNP transistor T5 through the diodes D4 and D'4 respectively and, on the other hand, to the input of a Schmitt trigger circuit comprising the PNP transistors T6 and T7 through the silicon diodes D5 and D'5 respectively. The base or input electrode of the transistor T5 is connected to the battery B($-20$ v.) and to ground through the resistors R25 (R25=22,000 ohm) and R26 (R26=1,800 ohm) respectively. The emitter of T5 is connected to ground via the silicon diode D7 and its collector is connected on the one hand to the battery B through the resistor R27 (R27=10,000 ohm) and on the other hand to the input of the trigger circuit T6, T7, i.e. the base of the transistor T6, via the decoupling diode D6. The base and the emitter of the normally conductive transistor T6 are grounded through the resistors R31 (R31=2,200 ohm) and R29 (R29=220 ohm) respectively. The collectors of the transistors T6 and T7 are connected to the battery B, through the resistors R28 (R28=5,600 ohm) and R32 (R32=56 ohm) respectively. The collector of the transistor T6 is also connected to the base of the normally non-conductive transistor T7 and the emitter of T6 is also connected to the emitter of T7 through the resistor R30 (R30=3,900 ohm). The output of the trigger circuit T6, T7 is taken from the emitter of the transistor T7.

The output $ni$ of the Schmitt trigger circuit T2, T3 of the frequency receiver U$i$ ($i=1$ to 8) assumes substantially a potential of —1.5 v. when the trigger circuit T2, T3 is in its rest condition, i.e. T2 conductive, T3 cut-off, and a potential of —18 v. when this trigger circuit is in its activated condition, i.e. T2 cut-off, T3 conductive. The silicon diodes D5, D′5 and D7 present a threshold voltage of 0.7 v. in the forward direction. Hence, when all the inputs $n1$ to $n8$ of the code checking circuit are in the rest condition, i.e. at the potential of —1.5 v., the diodes D4 and D′4 are forwardly biassed, their anodes being at a potential of —0.32 v. Due to this, the base of the transistor T5 is also at the potential —0.32 v. and the transistor T5 is in the non-conductive condition. The base of the transistor T6 of the Schmitt trigger circuit T6, T7, is biassed at —3.6 v. through the circuit: battery B, resistor R27, conductive diode D6, resistor R31, ground. Thus, the silicon diodes D5 and D′5 are in the blocked condition and the trigger circuit T6, T7 is in its rest condition, i.e. T6 conductive T7 cut-off.

The timing circuit TC comprises a decoupling diode D8 connected in series with the series connection of a resistor R33 (R33=8,200 ohm) and a Zener diode ZN1. The junction point of the resistor R33 with the anode of the Zener diode ZN1 is connected on the one hand to ground via a capacitor C2 (C2=6,8$\mu f$.) and on the other hand to the output $r$ of the register REG (FIG. 1) through the discharge circuit DSG and the connection $r2$. The circuit DSG, when activated, enables the discharge of the capacitor C2.

The memory circuit MC comprises a buffer amplifier BA, a bistable circuit FF and a reset circuit RST which enables the reset of this bistable circuit FF. The input of the buffer amplifier BA is connected to the cathode of the Zener diode ZN1 of the timing circuit TC. The output of BA is connected to the 1-input of the bistable circuit FF the 1-output of which is connected, on the one hand to the enabling input $h$ of the gating circuit GC (FIG. 1) through the conductor $h$ and, on the other hand, to the conductors $g1$, $g2$ of the blocking circuits BL$i$ (FIG. 2) through the conductor $g$. The reset circuit RST has its input $r1$ connected to the output $r$ of the register REG and its output connected to the 0-input of the bistable circuit FF.

Referring to FIG. 4, there is shown in detail a preferred embodiment of the buffer amplifier BA and the bistable circuit FF both included in the memory circuit MC of FIG. 3, and of the blocking circuit BL$i$ of FIG. 2.

The buffer amplifier BA comprises the normally not conductive PNP transistor T8 which has its emitter and collector electrodes connected to ground and to a battery B through the resistors R37 and R34 respectively (R37=1,000 ohm, R34=10,000 ohm). The base of T8 constitutes an input electrode and is connected on the one hand to the cathode of the zener diode ZN1 (FIG. 3), and on the other hand to ground via the resistor R47 (R47=10,000 ohm). The collector of the transistor T8 is also connected to ground through the series connection of the resistors R35 and R36 (R35=8,200 ohm, R36=2,200 ohm). The junction point of the resistors R35, R36 is connected to the input of the bistable circuit FF through the decoupling diode D9. The bistable circuit FF comprising the PNP transistors T9 and T10 is similar to the Schmitt trigger T2, T3 (FIG. 2), but has been rendered bistable by a suitable choice of the potentiometer resistors R38, R39 biassing the base of the transistor T9 (R38=33,000 ohm, R39=2,200 ohm). The additional diode D10 stands for decoupling purposes, in order to enable the reset of the bistable circuit FF via the reset circuit RST. The bistate circuit FF is provided with two 1-outputs indicated by $gh$ and $gl$. The output $gl$ which is taken from the junction point of the resistors R43, R44 is connected to the anode of the diode D2 of the blocking circuit BL$i$. The value of the resistor R44 (R44=220 ohm) is small with respect to the value of the resistor R43 (R43=2,200 ohm) so that the 1-output $gl$ is substantially at ground potential when the bistable circuit FF assumes its 0-condition. The other 1-output $gh$ is taken from the cathode of a Zener diode ZN2, this cathode being connected to ground through a resistor R46 (R46=820 ohm). This has been done in order to avoid spurious interactions between the circuits FF, BL$i$, U$i$ and GC due to the normal 1-output (emitter of T10) of the bistable circuit FF being at a slightly negative potential (—1.5 v.) when this bistable circuit is in its 0-condition. The anode of the Zener diode ZN2 is connected to the emitter of the transistor T10. The output $gh$ is connected on the one hand, to the gating circuit GC via the conductor $h$ and, on the other hand, to the emitter of the transistor T1 (FIG. 2) through the series connected conductors $g$, $g2$, the resistor R′14 and the diode D11. The remaining circuitry of the circuits FF and BL$i$ is similar to that previously described and this description is therefore not repeated.

Hereinafter the operation of the code checking circuit CH will be described in connection with the operation of the above multifrequency data receiver of which it forms part, reference being made to the FIGURES 1 to 4. A data signal emitted by a data sender (not shown) and constituted by two frequencies, one frequency out of the high frequency group and one out of the low one, is applied to the group separation filters FG1 and FG2 of the data receiver via the telephone line LN. These two frequencies cause the operation of a frequency receiver of the first and of the second receiver group respectively, e.g. of the frequency receivers U1 and U5. The thus activated outputs of these frequency receivers U1, U5 activate the inputs $v1$, $v5$ and $n1$, $n5$ of the code recognition circuit CR and of the code checking circuit CH which is included in the verification circuit CC.

In a well known manner the code recognition circuit CR recognizes, the twelve characters among the sixteen possible which are used in the present data receiver. Due to this, one of the $m$ outputs of the circuit CR, which corresponds to the received data signal, is activated the corresponding input of the gating circuit GC is also activated.

The verification circuit CC (of which the inputs $n1$ and $n5$ have been activated) provides its response, i.e. output $gh$ is activated, after a predetermined time interval fixed by the timing circuit TC. The activated output $gh$ of the verification circuit on the one hand activates the second input $h$ of the AND gates of the gating circuit GC and on the other hand via the conductor $g$ desensitizes the frequency receivers U1 to U8 against spurious or other signals, while maintaining in the activated condition the already activated outputs of the frequency receivers U1 and U5, as will now be explained.

The frequency receivers U1 and U5 have reacted to the data signal, the corresponding diodes D1 of the associated blocking circuits BL1 and BL5 are brought in their blocked condition, while the diodes D1 of the other blocking circuits remain conductive. The transistors T4 of the blocking circuits BL1 and BL5 remain in the blocked condition up to the moment that the 1-output of the bistable circuit FF is activated. At that moment, on the one hand, the diodes D2 of all the blocking circuits BL1 to BL8 are blocked. Only the transistors T4 of the circuits BL1 and BL5 are brought in their conductive condition. On the other hand, the transistors T1 of all the frequency receivers U1 to U8 are locked due to the negative potential applied to their emitter by the above activated 1-output of the bistable FF though the respective resistors R14 or R'14 and diodes D11. The conductive transistors T4 of the blocking circuits BL1 and BL5 apply via their collector electrode a suitable potential to the input of the Schmitt trigger circuits T2, T3 of the associated frequency receivers U1 and U5, thus maintaining these trigger circuits in the operated condition.

Due to the frequency receivers U1 and U5 having reacted to the received data signal the inputs $n1$ and $n5$ of the code checking circuit CH are activated, i.e. $n1$ and $n5$ are brought at a −18 v. potential. Due to this the anodes of the diodes D4 and D'4 are brought at a potential substantially equal to −1.15 v. but these diodes D4 and D'4 remain conductive. The transistor T5 having its base also biassed at −1.15 v. is however saturated and its collector potential is brought at −0.7 v. Due to the diode D6 being conductive and the silicon diodes D5 and D'5 being blocked, since their anode-cathode potential difference is less than 0.7 v. (i.e. 0.45 v.), the base of the transistor T6 is biassed at −0.7 v. Consequently, the Schmitt trigger circuit T6, T7 is triggered in its second condition, i.e. the transistor T6 is cut off and the transistor T7 is rendered conductive. It is to be noted that the trigger circuit T6, T7 is in its first (i.e. rest) or in its second condition according to the base of the transistor T6 being biassed at a potential more negative or more positive than −1 v.

Assuming now that the inputs $n1$, $n2$ and $n5$ of the check circuit CH are activated, this corresponding to a wrong code, it is readily seen that the diodes D4 and D'5 are then blocked, whereas the diodes D5 and D'4 are then conductive. The conductive diode D'4 fixes the base potential of the transistor T5 as −1.15 v. so that the latter transistor T5 saturates and its collector potential is again −0.7 v. However the base potential of the transistor T6 is now fixed by the conductive diode D5 at −1.46 v. (−2.16+0.7) due to the diode D6 being blocked. Consequently, the trigger circuit T6, T7 remains in its first or rest condition.

In a similar manner it may easily be demonstrated that the trigger circuit T6, T7 remains in its rest condition for any wrong code.

It is to be noted that for being legitimate a received data signal must have a minimum duration equal to the time required by the varification circuit CC to provide a response. Any other signal having a duration less than the above minimum one is not recognized as legitimate and it is not registered. This realized by the timing circuit TC in the following manner. Upon the trigger circuit T6, T7 of the code checking circuit CH having been triggered in its second condition, i.e. transistor T7 conductive, due to the receipt of a correct code, the capacitor C2 is charged up to the break-down voltage, e.g. −10 v, of the Zener diode ZN1, in the following RC circuit: battery B, resistor R32, saturated collector-emitter junction of transistor T7, conductive diode D8, resistor R33, capacitor C2, ground. Upon the capacitor C2 being charged at the break down voltage of the Zener diode ZN1, the latter diode becomes conductive and the 1-input of the bistable circuit FF is activated through the buffer amplifier BA. The charging time of the capacitor C2 or the values of the R, C elements of the above RC circuit, determine the minimum duration a received data signal must have for being recognized as legitimate. The discharge and reset circuits DSG and RST may each be constituted by a make contact $p1$ and $p2$ respectively of a relay Pr (not shown) included in the register circuit REG. The register circuit REG upon registering a received data signal, activates the relay Pr for a short time and the make contacts $p1$ and $p2$ are closed during this time. The closed make contacts $p1$ and $p2$ connect the charged of the capacitor C2 and the 0-input of the bistable circuit FF to ground and to a battery respectively. In the above realization of the discharge and reset circuits DSG and RST, it is evident that the connections, $r$, $r1$, $r2$ represent the magnetical couplings between the relay Pr and its contacts $p1$ and $p2$.

While the principles of the invention have been described above in connection with specific apparatus, it is to be clearly understood that this description is made only by way of example and not as a limitation on the scope of the invention.

We claim:

1. A code checking circuit connected to a number of DC potential sources and adapted to react upon all of said sources that have their potential in a predetermined potential range, electrical means common to all the sources, said electrical means being able to assume two distinct electrical conditions, individual first and second rectifying means for connecting each of said sources to said electrical means, said common electrical means including, a level detecting means having an active and rest condition, means for connecting an input of said detecting means to said DC potential sources through said first individual rectifying means, a trigger circuit, decoupling means comprising a third rectifying means for connecting an input of said trigger circuit to the output of said level detecting means and to the DC potential sources via said second individual rectifying means, said trigger circuit having a first and a second condition, means for setting said trigger circuit in its second condition responsive to the condition wherein all said sources have a potential in said predetermined range, said first and said second individual rectifying means being then in the conductive and blocked condition respectively, means for setting said trigger circuit into its first condition responsive to the condition wherein the potential of at least one of said sources is either below or above said predetersponsive to the condition wherein the potential of at least one of said sources is either below or above said predetermined range, both the first and the second individual rectifying means of said one source being then either conductive and blocked, or blocked and conductive respectively, and means responsive to the condition wherein at least one of said sources has it potential below said predetermined range for setting said level detecting device to the rest condition.

2. The code checking circuit of claim 1 wherein said level detecting means comprises; an amplifying device with at least three electrodes, first and second resistance means for connecting the first electrode to a first and to a second fixed DC potential respectively, third resistance means for connecting the second electrode to a third fixed DC potential, means for coupling the third electrode to a fourth fixed DC potential, and fourth resistance means for connecting the input of said trigger circuit to a fifth fixed DC potential.

3. The code checking circuit of claim 2 wherein said second, fourth and fifth fixed DC potentials are identical, and fourth rectifying means connecting said third electrode to said fourth fixed DC potential.

4. The code checking circuit of claim 2 wherein said trigger circuit is a Schmitt trigger circuit.

5. The code checking circuit of claim 1 wherein each of said DC potential sources includes an arrangement comprising a common resistance connected at one end to a sixth fixed DC potential, individual switching means means for connecting the other end of said common resistance to the ends of a plurality of individual resistances which at their other ends are each connected through said individual switching means to a seventh DC potential, a DC potential in said predetermined range being provided by said arrangement when a predetermined number of said individual switching means are activated.

6. A multi-frequency data receiver including a number of sets of narrow-band frequency receivers, a predetermined number of said frequency receivers out of each of said sets reacting to a received data signal, code checking means to verify the correctness of said received data signal, timing means for delaying the response of said code checking means, bistable means to memorize the delayed response of said code checking means, a plurality of blocking means for controlling the condition of individually associated ones of said frequency receivers when said bistable means have memorized said delayed response, each of said narrow-band frequency receivers comprising a narrow frequency band filter, input amplifier means for amplifying the output of said narrow band filter, a smoothing filter for smoothing the output of said input amplifier means, a trigger circuit having one input and at least one output, said output assuming first or second fixed DC potentials according to whether said one input is in a rest or an activated condition respectively, said blocking means including a number of normally blocked switching devices equal to the number of said frequency receivers and correspondingly associated thereto, each of said switching devices having at least three electrodes, first diode means for connecting the first electrode to an output of said trigger circuit of the associated frequency receiver, decoupling diode means for connecting the first electrode to an 1-output of said bistable means, means for connecting said first electrode to third and fourth fixed DC potentials through first and second resistance means respectively, means for connecting the second electrode to the input of said trigger circuit through a third resistance means, for connecting the third electrode to said third fixed DC potential, means responsive to the condition wherein the associated trigger circuit and said bistable means having been triggered from their 0 to their 1-condition respectively for blocking said first and said second diodes which are normally conductive, and means whereby each of said switching devices, is changed to the conductive condition responsive to the condition wherein both said first diode means and said decoupling diode means being blocked, the conductive switching device then maintaining said associated trigger circuit in the operated condition.

7. The multi-frequency data receiver of claim 6 wherein said input amplifier comprises a transistor, which has at least a base, a collector and an emitter, means for connecting said emitter to a fifth fixed DC potential, and third diode means for coupling said emitter to said 1-output of said bistable means, said third diode means is normally in the blocked condition, for energizing said third diode to the conductive condition, and means responsive to the condition wherein said third diode is in the conductive state for causing the cut-off of the associated input amplifier when the 1-output of said bistable means is activated.

8. The multi-frequency data receiver of claim 7 wherein said third electrode of said switching device is connected to said third fixed DC potential through a zener diode.

9. The multi-frequency data receiver of claim 6 and timing means for coupling the output of said checking circuit to the 1-input of said bistable means, said timing means comprising a series connection of a fourth diode, a fourth resistor and a fifth diode, said fifth diode being a Zener diode, capacitor means for coupling the junction of said fourth resistor and said fifth diode to a sixth fixed DC potential, means responsive to the output of said checking circuit being activated for causing the charge of said capacitor means to build up to a breakdown voltage of said fifth diode, and discharge means for periodically discharging said capacitor.

10. The multi-frequency data receiver of claim 9 wherein means are provided for connecting said one output of the trigger circuit of each of said frequency receivers to a corresponding input of said code checking circuit, and wherein the trigger circuit included in the checking circuit comprises said individual switching device and a seventh DC potential.

References Cited

UNITED STATES PATENTS

| | | | |
|---|---|---|---|
| 2,675,538 | 4/1954 | Malthaner et al. | 340—146.1 X |
| 2,784,393 | 3/1957 | Schultheis, Jr. | 340—185 |
| 2,966,659 | 12/1960 | Dahlbom et al. | 340—171 |
| 3,128,349 | 4/1964 | Boesch et al. | 179—84 |
| 3,143,602 | 8/1964 | Morrison et al. | 179—84 |
| 3,238,503 | 3/1966 | Uitermark et al. | 340—171 |

MALCOLM A. MORRISON, Primary Examiner

CHARLES E. ATKINSON, Assistant Examiner

U.S. Cl. X.R.

179—84; 340—171